United States Patent [19]

Carey, Jr.

[11] Patent Number: 4,522,222

[45] Date of Patent: Jun. 11, 1985

[54] NON-PLUGGING INJECTION VALVE

[75] Inventor: Henry S. Carey, Jr., Wilsonville, Ala.

[73] Assignee: Kerr-McGee Corporation, Oklahoma City, Okla.

[21] Appl. No.: 421,534

[22] Filed: Sep. 22, 1982

[51] Int. Cl.³ .............................. B08B 3/04; B08B 9/00
[52] U.S. Cl. ..................................... 137/240; 137/244; 134/166 C; 251/122; 251/360
[58] Field of Search ............... 137/240, 244, 317, 318, 137/319, 320, 375; 138/45, 46; 251/118, 122, 360; 134/166 C

[56] References Cited

U.S. PATENT DOCUMENTS

| 1,026,533 | 5/1912 | Stewart | 251/122 |
|---|---|---|---|
| 2,448,816 | 9/1948 | May | 137/244 |
| 2,566,502 | 9/1951 | Smith | 137/317 |
| 2,881,783 | 4/1959 | Andrews | 137/244 |
| 3,033,657 | 5/1962 | Smith | 137/240 |
| 3,367,358 | 2/1968 | Rentschler | 137/375 |
| 3,480,036 | 11/1969 | Ehrens et al. | 137/318 |
| 3,995,655 | 12/1976 | Sands | 285/197 |
| 4,047,695 | 9/1977 | Cleveland et al. | 251/122 |
| 4,248,692 | 2/1981 | Knebel et al. | 137/240 |
| 4,413,646 | 11/1983 | Platt et al. | 251/122 |

FOREIGN PATENT DOCUMENTS

| 12237 | 1/1925 | Netherlands | 137/321 |
|---|---|---|---|
| 350512 | 1/1961 | Switzerland | 137/317 |
| 19628 | of 1908 | United Kingdom | 137/317 |
| 19440 | of 1912 | United Kingdom | 137/319 |

OTHER PUBLICATIONS

Parts list and drawing, Badger Meter Co., Model 960,799 Valve.

Primary Examiner—George L. Walton
Attorney, Agent, or Firm—William G. Addison

[57] ABSTRACT

A valve for injecting fluid into a conduit carrying a slurry subject to separation to form deposits capable of plugging openings into the conduit. The valve comprises a valve body that is sealed to the conduit about an aperture formed through the wall of the conduit to receive the fluid to be injected and the valve member of the valve includes a punch portion that extends through the injection aperture to the flow passage, when the valve is closed, to provide a clear channel into the conduit, when the valve is opened, through deposits which might have formed on portions of the valve adjacent the conduit.

10 Claims, 4 Drawing Figures

NON-PLUGGING INJECTION VALVE

BACKGROUND OF THE INVENTION

The present invention relates generally to improvements in injection valves and, more particularly, but not by way of limitation, to valves used to inject solvents into conduits of coal deashing plants.

The process for deashing coal by the treatment of pulverized coal with a solvent at elevated temperature and pressure has been described in U.S. Pat. No. 4,162,956 issued July 31, 1979 to Donald E. Rhodes, such patent being assigned to the assignee of the present invention. In this process, a solvent-coal mixture is permitted to separate into two phases in a separation zone with the heavier phase, comprised of a suspension of ash in the solvent, gravitating to the lower end of the vessel defining the zone. This suspension, or slurry, is drawn from the vessel and transported to a flash zone wherein the slurry is flashed to recover the solvent which can then be reused in the deashing process.

As will be recognized by those skilled in the art, the transport of the slurry to the flashing zone can present practical problems that must be overcome if the operation of the deashing plant is to be successful. In particular, the danger exists that the ash will settle from the slurry during transport to the flash zone to plug the conduit by means of which the transport is effected. Should this occur, the process must be interrupted and the plant partially dismantled to eliminate the blockage. This is neither a simple nor inexpensive task because of the nature of the materials involved and the temperature and pressure conditions under which the process is carried out. Moreover, these problems feed upon themselves; the conditions in the conduit which give rise to the difficulties of clearing a blockage are necessary to maintain the ash in suspension.

A variety of factors enter into the formation of a blockage in the conduit to the flash zone and one such factor is the consistency of the slurry. The tendency of the ash to settle out from the slurry increases with the weight of the slurry and, because of this factor, it is useful to provide the conduit with a means for injecting additional solvent into the conduit should the slurry, as drawn from the separation zone, contain too high a proportion of ash to solvent to be transported to the flash zone without risk of a blockage occurring. Because of the conditions of operation of a coal deashing plant, the injection of the additional solvent must be under the control of the plant operator and, accordingly, such injection is carried out through an injection valve provided for that purpose.

A problem has occurred with this aspect of deashing plant operation and such problem stems from other factors that enter into the separation of the ash from the solvent with which it forms a slurry. In particular, the ash tends to form deposits on surfaces in which it is in static contact and also tends to form deposits at cold spots in the conduit-injection valve system. While these conditions are prevented in the conduit itself; for example, cold spots are prevented by providing the conduit with a concentric insulating jacket, the conditions can occur in portions of the valve in fluid communication with the flow passage through the conduit. When the valve is closed, the slurry can enter the port of the valve through which the solvent is injected into the conduit and stagnate therein. In addition, the valve itself forms a heat leak from the conduit so that the valve will have a tendency to cool slurry that has entered portions of the valve. The immediate result is that the valve exit port can become plugged so that additional solvent cannot be injected into the conduit when such additional solvent is needed. The eventual result can be a blockage of the conduit itself that requires an expensive shut down of the plant to clear ash deposits from the valve and from the conduit to the flash zone.

SUMMARY OF THE INVENTION

The present invention solves this problem with a novel injection valve that is immune to plugging despite deposits that might form on portions of the valve exposed to a slurry that is transported by a conduit upon which the valve is mounted. To this end, the valve closure member; that is, the portion of the valve that closes the port of the valve through which a solvent is injected into the conduit, is constructed to move toward and away from an aperture formed through the conduit wall for fluid injection to open and close the port into the conduit. In order to prevent blockage of the port, the valve closure member is provided with a punch portion that extends through the port and through the conduit wall to the flow passage of the conduit in the closed position of the valve. This punch portion excludes fluid carried by the conduit from at least central portions of the port so that, when the valve is opened by withdrawal of the valve closure member from the port, a clear channel is left through the port for the injection of liquid into the conduit.

An object of the present invention is to provide a non-plugging injection valve for use on conduits which carry slurries that are subject to separation into solid and liquid components.

Another object of the invention is to provide an injection valve which is immune to plugging despite deposits that might be formed on portions thereof in fluid contact with liquid-solid suspensions.

Other objects, advantages and features of the present invention will become clear from the following detailed description of the preferred embodiment of the invention when read in conjunction with the drawings and appended claims.

DESCRIPTION OF THE PREFERRED EMBODIMENT

Figure 1:
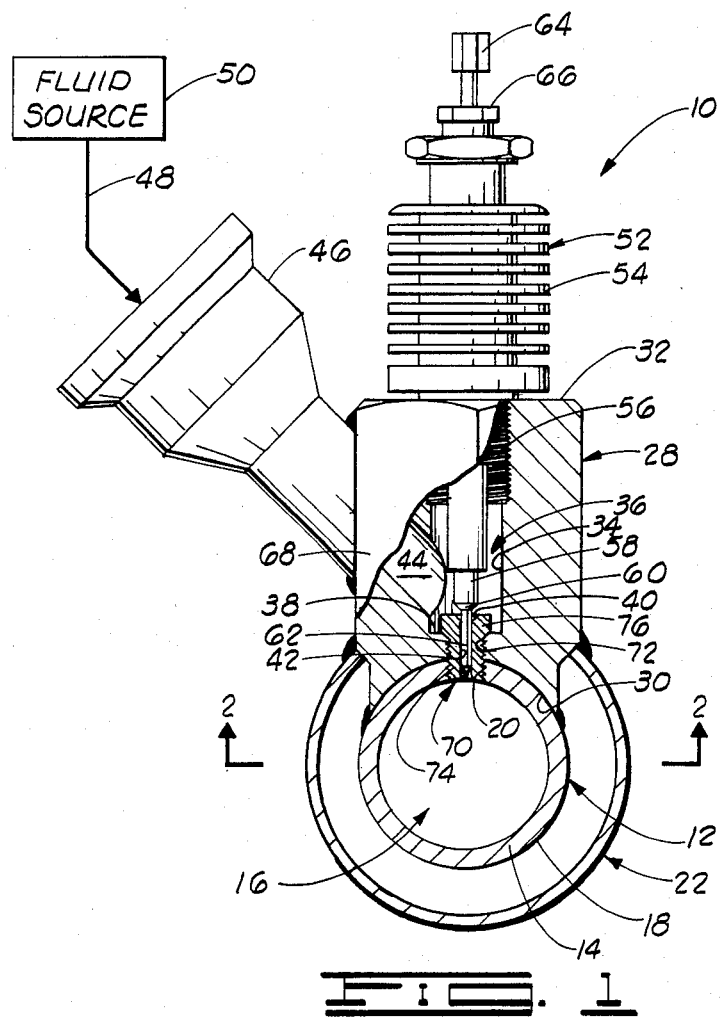
FIG. 1 is a partial cross section in end elevation of an injection valve constructed in accordance with the present invention illustrating the preferred mounting of the valve on a conduit.
Figure 2:
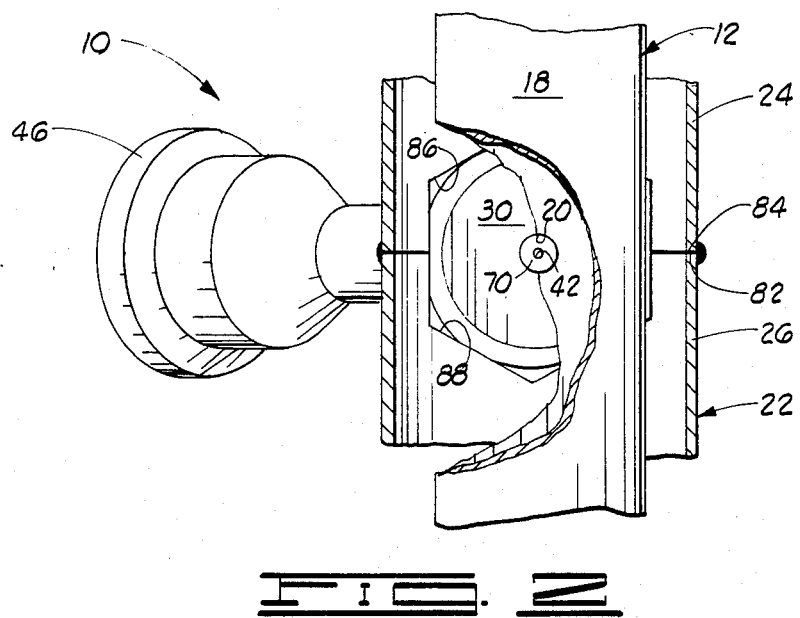
FIG. 2 is a cross section of the valve-conduit system of FIG. 1 taken along line 2—2 of FIG. 1.

Referring now to the drawings in general and to FIGS. 1 and 2 in particular, shown therein is an injection valve 10, constructed in accordance with the present invention, mounted on a conduit 12 which can be the conduit between a separation zone and a flashing zone in a coal deashing plant. The conduit 12 has a wall 14 defining a flow passage 16 extending therethrough through which a fluid material is transported by the conduit 12 in the application for which the conduit 12 has been provided. The valve 10 is mounted on the outer peripheral surface 18 of the conduit 12 and an injection aperture 20 is formed through the wall 14 of the conduit 12 to provide for entry or injection of a fluid from the valve 10 into the flow passage 16. In the preferred construction of the valve 10 and conduit 12, the injection aperture 20 is internally threaded for a reason and in a manner to be discussed below.

It is contemplated that the conduit 12 and portions of the valve 10 will be enclosed within an insulating jacket in many applications and such a jacket, designated by the numeral 22, has been shown in FIGS. 1 and 2. The jacket 22 can be divided into two sections 24 and 26 to facilitate placement of the jacket 22 about the conduit 12 as will be discussed below.

Referring now to the valve 10, the valve 10 comprises a valve body 28 generally having a first end 30 which is sealed to the conduit 12 about the injection aperture 20 by welding the valve body 28 to the conduit 12 as indicated in FIG. 1. In the preferred embodiment of the invention, the first end 30 is shaped to conform to portions of the conduit 12 so that substantially the entire first end 30 of the valve body 28 abuts and contacts the wall 14 of the conduit to enhance thermal coupling between the valve 10 and the conduit 12 so that temperature differences between fluid in the flow passage 16 and in portions of valve 10 adjacent the conduit 12 will be minimized. Thus, where the conduit 12 is circular in cross-section, the end 30 will be formed on a radius equal to the radius of the conduit 12 as has been shown in the drawings. The minimization of this temperature difference, the purpose of which will be discussed below, is further enhanced by the disposition of portions of the valve body 28 within the jacket 22 as has been shown in FIG. 1.

The valve body 28 extends generally radially from the conduit 12 to terminate in a second end 32 spaced from the conduit 12 and disposed generally parallel to the axis of the flow passage 16. A bore 34 is formed in the valve body 28 from the second end 32 thereof to form a valve chamber 36 in central portions of the valve body 28 and portions of the bore 34 are threaded adjacent the second end 32 of the valve body 28. The bore terminates within the valve body 28 in a floor 38 near the conduit 12 and a frusto-conical valve seat 40 is formed within a portion of the valve body 28 near the floor 38. The seat 40 converges toward the conduit 12 to open into an exit port 42 for the valve 10 from the valve chamber 36, the valve body 28 being oriented on the conduit 12 such that the exit port 42 extends coaxially from the injection aperture 20 through the wall 14 of the conduit 12. Thus, the exit port 42 extends through the valve body 28 and intersects the valve chamber 36 and a portion of the valve body 28, the exit port 42 being alignable with the injection aperture 20 in the conduit 12 when the valve body 28 is mounted on the conduit 12. To provide for the introduction into the valve chamber 36 of a fluid to be injected into the conduit 12, a sloped, generally laterally extending bore 44 is formed in one side of the valve body 28 to intersect the valve chamber 36 and a portion of the valve body 28, and a conventional pipe coupling 46 is welded to such side of the valve body 28 to permit delivery of the fluid to be injected into the conduit 12 to the valve chamber 36 via suitable piping, schematically indicated at 48, from an appropriate source that has been schematically indicated at 50 in FIG. 1.

The valve 10 further comprises a bonnet assembly 52 which, in turn, comprises a housing 54 having a threaded projection 56 on one thereof to screw into the threaded portion of the bore 34 which forms the valve chamber 36. The bonnet assembly 52 is of conventional construction and includes a valve closure member 58 that extends through a bore (not shown) extending through the housing 54. Suitable seals (not shown) are formed about the valve closure member 58 in the housing 54 to prevent leakage of the valve 10 about the valve closure member 58. In the practice of the present invention, the bonnet assembly 52 is selected to be of the type in which the valve closure member 58 is slideably supported in the bore of the housing 54 and such bore is aligned with the exit port 42 so that the valve 10 can be opened and closed by moving the valve closure member 58 away from and toward the seat 40 of the valve body 28. In particular, the valve closure member 58 is provided with a frusto-conical seat 60 that mates with the seat 40 in a valve closure position so that the valve 10 can be closed by moving the valve closure member 58 toward the conduit 12 to engage the seat 60 with the seat 40, thereby interrupting fluidic communication betweeen the valve chamber 36 and the exit port 42. Conversely, the seat 60 can be displaced from the seat 40, as particularly shown in FIG. 4, to define an open position for the valve closure member 28 that provides fluid communication between the valve chamber 36 and the exit port 42. For a purpose that will be discussed below, the valve closure member 58 of the present invention is provided with a punch portion 62 that extends from the seat 60 and into the exit port 42 formed in the valve body 28 the punch portion 62 extending through the injection aperture 20 in the conduit 12 in the valve closure position of the valve closure member 58 and slightly into the flow passage 16.

The valve 10 is preferably operated by a standard pneumatic actuator (not shown) and for this purpose, the valve closure member 58 is extended completely through the housing 54 to terminate in a connector 64 that protrudes from the distal end 66 of the housing 54. A pneumatic actuator can then be attached to the connector 64 to provide for opening and closing of the valve 10 by means of pneumatic signals transmitted to the actuator from a control house by an operator of a process involving the flow of fluid through the conduit 12.

Figure 3:
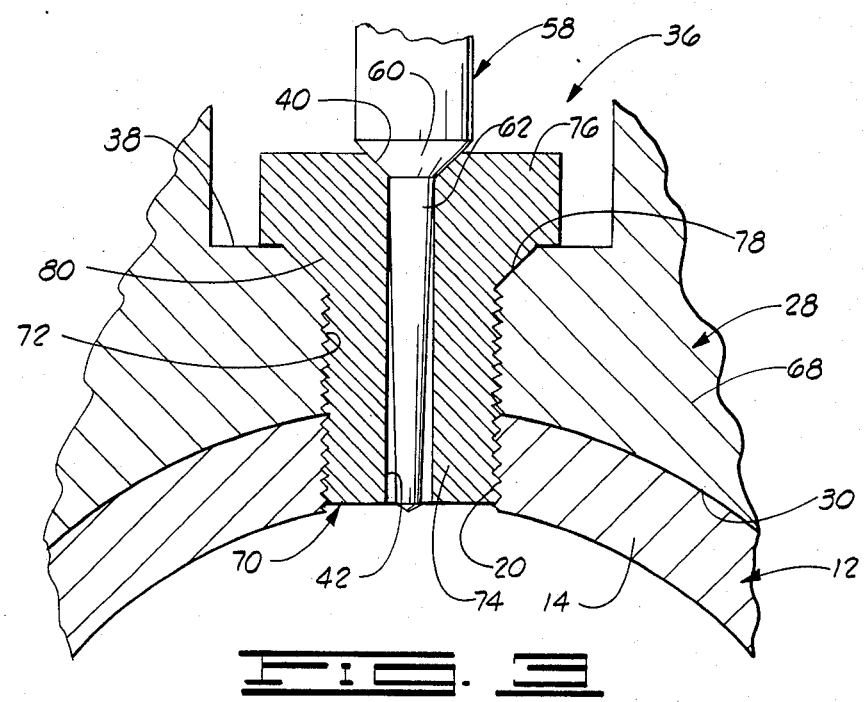
FIG. 3 is an enlarged cross section of portions of the valve and conduit of FIG. 1.
Figure 4:
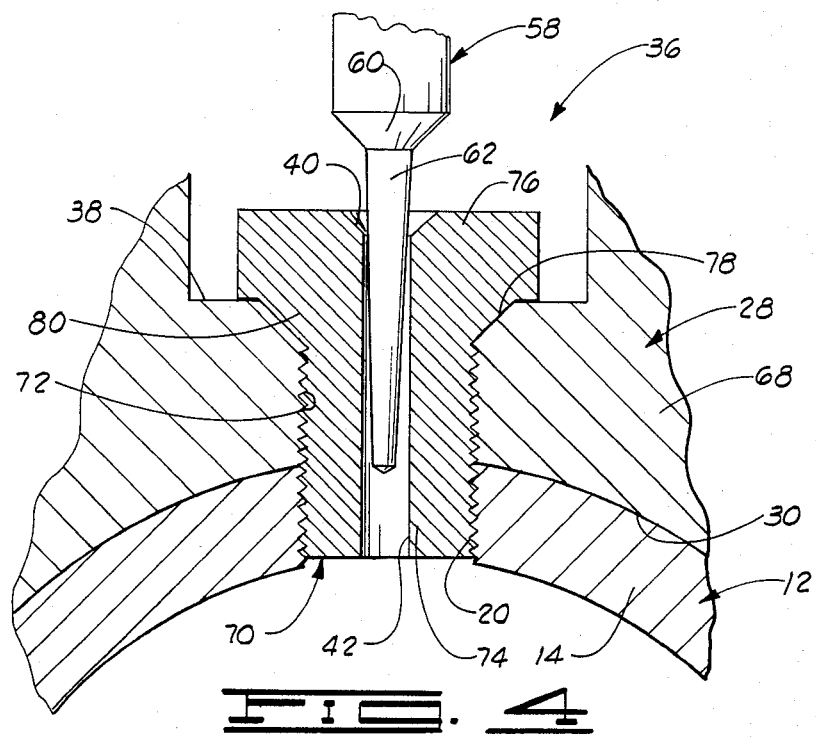
FIG. 4 is a cross section similar to FIG. 3 showing a different position of the valve closure member of the valve.

In the preferred embodiment of the invention, the valve body 28 is constructed in two parts which can be screwed together during the mounting of the valve 10 on the conduit 12 and such construction has been particularly illustrated in FIGS. 3 and 4 wherein portions of the valve 10 adjacent the conduit 12 have been illustrated on an enlarged scale. In particular, the valve body 28 is comprised of a chamber portion 68, wherein the valve chamber 36 is formed and to which the pipe coupling 46 is attached, and a seat portion 70, wherein the seat 40 is formed.

As shown in FIGS. 3 and 4, the chamber portion is provided with a threaded bore 72 formed to extend coaxially with the valve closure member 58 at such times that the bonnet assembly 52 is screwed into the valve body 28 and the bore 72 intersects the floor 38 of the valve chamber 36 and the first end 30 of the valve body 28 to extend therebetween. In the preferred practice of the invention, the bore 72 is formed on the same diameter as the diameter of the injection aperture 20 through the wall 14 of the conduit 12 and, by means discussed below, the threads of the aperture 20 are caused to be a continuation of the threads in the bore 72.

The seat portion 70 through which the exit port 42 is formed, has the general form of a threaded plug. In particular, the seat portion 70 comprises a barrel portion 72 externally threaded along substantially the entire length thereof and a larger, faceted portion 76 surmounting the barrel portion 74 so that the seat portion 70 can be screwed tightly into the bore 72 to seal with the chamber portion 68 of the valve body 28 at the floor 38 of the valve chamber 36. (The facets of the faceted portion 76, such facets extending parallel to the axis of the barrel portion 74, have not been shown in the drawings.) The seat between the chamber portion 68 and the seat portion 70 of the valve body 28 can be further enhanced by a frusto-conical surface 78 formed in the floor 38 of the valve chamber 36 and a frusto-conical portion 80 of the seat portion 70 of the valve body 28 disposed between the barrel portion 74 and faceted portion 76 thereof. In the preferred construction of the valve 10, the barrel portion 74 of the valve seat portion 70 protrudes from the first end 30 of the valve body 28 to screw into the injection aperture 20 formed through the wall 14 of the conduit 12.

FIGS. 3 and 4 further illustrate a preferred feature of the punch portion 62 of the valve closure member 58. As shown in these drawings, the punch portion 62 is tapered from the seat 60 to converge toward the conduit 12 so that a narrow annulus of increasing width toward the conduit 12 is formed about the punch portion 62 by the exit port 42. (For purposes of illustration, the taper of the punch portion 62 has been exaggerated in FIGS. 3 and 4.) In some applications, it will be desirable to meter the rate of injection of fluid into the conduit 12 and the taper of the punch portion 62 of the valve closure member 58 provides for such metering.

PREFERRED ASSEMBLY OF THE INJECTION VALVE

An advantageous aspect of the present invention is that the valve 10 can be constructed by modifying a conventional valve, preferably a conventional metering valve, which includes selected features to be incorporated into the valve 10. A particular valve, which can be inexpensively and quickly modified to construct the valve 10 is the model 960799 valve manufactured by Badger Meter, Inc. of Tulsa, Okla. Such valve has a valve body, including a separate, plug-like seat portion, which can be readily modified to form the chamber portion 68 and seat portion 70 of the valve 10. The modification is carried out by cutting away portions of the valve body of the conventional valve along a surface that intersects the bore into which the seat portion screws and, further, that will mate with the surface 18 of the conduit wall 14. When this mode of construction of the valve 10 is utilized, the surface along which the valve body of the conventional valve is cut is selected to provide a particular position for the punch portion 62 of the valve closure member 58, with which the conventional valve is equiped, relative to the conduit 12 when the valve 10 is closed. Specifically, this surface, which defines the first end 30 of the valve body 28, is cut such that the punch portion 62 will extend substantially to the flow passage of the conduit 12 when the valve 10 is mounted on the conduit 12 with the bore 72 aligned with the injection aperture 20 and when the valve 10 is closed. Such relationship between the punch portion 62 of the valve closure member 58 and the conduit 12 has been shown in FIG. 3. In addition, where a conventional valve is used in the construction of the valve 10, the bore 44 may be drilled into the side of the valve body and the pipe coupling 46 may be then welded thereto, if needed, to provide for the introduction of fluid into the valve chamber 36 for injection into the conduit 12.

The assembly of the valve 10 is carried out following the fabrication of the valve body 28, preferably as described above, and is carried out with the jacket 22 initially removed from about the conduit 12 and with the bonnet assembly 52 and seat portion 70 removed from the chamber portion 68 of the valve body 28. As has been noted above, a desirable feature of the valve 10 and conduit 12 combination is that the seat portion 70 of the valve body 28 screw into the injection aperture 20 through the conduit wall 14. To this end, the chamber portion 68 of the valve body 28 is initially welded to the conduit 12 prior to formation of the injection aperture 20 through the wall 14 thereof. With the chamber portion 68 of the valve body 28 in place on the conduit 12, a punch that is sized to fit the bore 72 is extended through the bore 72 and struck to indent the conduit for centering a drill bit that is similarly inserted through the bore 72 to form an opening through the conduit 12 for the injection aperture 20. Following the drilling of the opening through the conduit wall 14, a tap is screwed into the bore 72 and continued into the aperture 20 to cut threads therein, the threads in the bore 72 providing a guide that will insure that the threads in the aperture 20 will form a continuation of the threads in the bore 72 and thereby permit the seat portion 70 of the valve body 28 to be screwed into the injection aperture 20.

The jacket 22, when a jacket 22 is used with the invention, can conveniently be mounted on the valve body chamber portion 68 to encase the conduit 12, following the welding of the chamber portion 68 to the conduit 12. It is to facilitate such mounting of the jacket 22 that the jacket 22 is formed in two sections 24 and 26 as described above. To prepare the jacket 22 for mounting, portions of the sections 24 and 26, intersecting ends 82 and 84 of the sections 24 and 26 (FIG. 2) to be abutted in the assembled jacket 22, are cutaway as at 86 and 88 (FIG. 2) to provide clearance for the valve body 28 through the jacket 22. The sections 24 and 26 of the jacket 22 are then placed over the conduit 12, from the ends thereof, and positioned about the conduit 12 and valve 10 as shown in FIGS. 1 and 2. The sections 24 and 26 of the jacket are then welded to each other and to the chamber portion 68 of the valve body 28 as indicated in FIGS. 1 and 2.

Final assembly of the valve 10 is accomplished by screwing the seat portion 70 of the valve body 28 into the bore 72 of the chamber portion 68 and into the injection aperture 20 followed by screwing the assembled bonnet assembly 52 into the valve body 28.

OPERATION OF THE PREFERRED EMBODIMENT

Although no limitation is intended with respect to applications to which the valve 10 might be put, it is contemplated that the valve 10 will be exceptionally useful in the control of processes, such as the above referenced coal deashing process, in which a fluid having a component capable of precipitation from a carrier liquid is transported from one place to another by a conduit such as the conduit 12. It will, accordingly, be useful to describe the operation of the valve 10 in conjunction with such a process in order to provide a complete understanding of the invention. Particularly, and for purposes of illustration only, it will be considered in the following description that the conduit 12 is the conduit between the separation zone and flash zone of a plant which carries out the coal deashing process referred to above.

At such times that the valve 10 is closed to fluid flow, portions of the exit port 42 will be exposed to the slurry passing through the conduit 12 and, moreover, the slurry that has entered the exit port 42 will be in an essentially static state. That is, the slurry in the exit port 42 will be moving only very slowly if at all. Similarly, if the barrel portion 74 of the seat portion 70 of the valve body 28 is not extended into the injection aperture 20 or if the valve body 28 is made in one piece not including a portion extending into the injection aperture 20, slurry would be disposed in at least portions of the injection aperture 20 in a static condition. Under this condition, ash suspended in the solvent will tend to precipitate therefrom to form deposits about the punch portion 62 of the valve closure member 58. However, such deposits will not be capable of forming a plug between the valve chamber 36 and the flow passage 16 of the conduit 12 because of the extension of the punch portion 62 substantially to the flow passage 16. Portions of the punch portion 62 adjacent the extensive end thereof will be subjected to a scouring action by the passage of slurry through the conduit 12 that will tend to maintain such end of the punch portion 62 substantially free of ash deposits with the result that the punch portion 62 will occupy a channel from the valve chamber 36 to the flow passage 16 that is free of ash deposits.

Should the operator of the plant wherein the valve 10 is used determine that additional solvent should be injected into the conduit 12, he initiates a pneumatic signal to the valve acutator that will cause the valve closure member 58 to be retracted to a position such as the position shown in FIG. 4. The position assumed by the valve closure member 58 in an open condition of the valve 10 can be varied by the operator to vary the rate of addition of the solvent into the conduit where the valve 10 has the above-described preferred construction including the tapered construction of the punch portion 62 of the valve closure member 58. Since the punch portion 62 in the closed condition of the valve 10 has occupied a volume that extends between the valve chamber 36 and the flow passage 16, a passage between the valve chamber 36 and the flow passage 16 is opened, without regard to any ash deposits that might have formed about the punch portion 62 while the valve 10 was closed, so that the flow of additional solvent into the conduit 12 is assured. Such flow will prevent the formation of further ash deposits while the valve 10 is open so that the valve 10 can subsequently be closed without difficulty should the injection of additional solvent become unnecessary.

While the basic object of the invention to provide a non-plugging injection valve is thus accomplished by the extension of the punch portion 62 to the flow passage 16 of the conduit 12, the preferred construction of the valve 10 described above confers additional benefits which need to be discussed. In particular, the conforming of the first end 30 of the valve body 28 to the shape of the outer peripheral surface 16 of the conduit 14 results in a high degree of thermal coupling between the slurry in the conduit 12 and portions of the valve 10 adjacent the conduit 12 so that such portions of the valve 10 will have been heated by the slurry passing through the conduit 12. Because of this heating, any deposits that might have been formed about the punch portion 62 will be at a temperature suitable for slurry formation and, further, the additional solvent will be preheated by contact with the valve body 28, such preheating being enhanced by the thermal coupling of the valve body 28 to the conduit 12, with the result that deposits that might have formed while the valve 10 was closed will tend to form a slurry with the additional solvent and be washed away while the valve 10 remains open. This self-cleaning effect, in part due to the shaping of the first end 30 of the valve body 28 to mate with the outer peripheral surface 16 of the conduit 12, is further enhanced by the extension of the barrel portion 74 of the valve body seat portion 70 into the injection aperture 20 and this enhancement is itself enhanced by the screw mating of the barrel portion 70 and the injection aperture 20. That is, in addition to limiting the buildup of deposits about the punch portion 12 by limiting the volume of static fluid thereabout, the barrel portion further carries forward the thermal coupling between the valve 10 and the conduit 16. Thus, the preferred embodiment described above is particularly suited to applications such as the injection of solvent into a separation zone-to-flash zone conduit. Only a small quantity of ash deposits can be formed in the vicinity of the injection valve 10 and such deposits cannot defeat the purpose of the valve 10 to inject solvent into the conduit 12. Additionally, such deposits that might be formed are removed each time the valve is opened to insure trouble free operation of the valve 10 over extended periods of time.

It will be clear that the present invention is well adapted to carry out the object and attain the ends and advantages mentioned as well as those inherent therein. While a presently preferred embodiment of the invention has been described for purposes of this disclosure, numerous changes may be made which will readily suggest themselves to those skilled in the art and which are encompassed within the spirit of the invention disclosed and as defined in the appended claims.

What is claimed is:

1. In a process for deashing coal by the treatment of pulverized coal with a solvent fluid at elevated temperature and pressure wherein the solvent-coal mixture is permitted to separate into two phases in a separation zone with the heavier phase gravitating to the lower end of the vessel defining the separation zone, in a valve apparatus for the process, the improvement comprising:

an annular pipe conduit having a flow passage extending therethrough, an outer peripheral surface, and an injection aperture formed through the conduit and intersecting the flow passage, the injection aperture being adapted for receiving fluid to be injected into the flow passage, one end of the conduit being connected to the vessel defining the separation zone for receiving the heavier phase and passing the heavier phase through the flow passage;

a valve body having a valve chamber formed in a portion of the valve body, a bore extending through a portion of the valve body intersecting the valve chamber and intersecting a portion of the valve body, an exit port extending through a portion of the valve body intersecting the valve chamber and intersecting a portion of the valve body, the bore being adapted for receiving the fluid and passing the fluid into the valve chamber, the valve body being mounted on an outer surface of the pipe conduit and the exit port being aligned with the injection port in the conduit a plug means being connected to the valve body through the exit port, a portion of the plug means being connected to the valve body within the exit port and another portion of the plug means being connected to the pipe conduit within the injection aperture when a frusto-conical surface on the plug means engages a frusto-conical surface on the interior of the valve body; and a valve closure member having a punch portion and being supported in the valve body, the valve closure member being moveable to a valve closure position when the valve closure member engages the plug means for interrupting fluidic communication between the valve chamber and the exit port and moveable to an open position establishing fluidic communication between the valve chamber and the exit port, the punch portion of the valve closure member extending through the portion of the plug means that is connected to the valve body within the exit port and another portion of the punch portion extending through the portion of the plug means that is connected to the pipe conduit through at least a portion of the injection aperture in the valve closure position of the valve closure member, the solvent fluid being passable through the bore, into the valve chamber, through the exit port and into the flow passage in the conduit in the open position of the valve closure member to prevent deposits from forming about the valve closure member.

2. The apparatus of claim 1 defined further to include: means for moving the valve closure member to the open position and to the valve closure position.

3. The apparatus of claim 1 wherein the punch portion of the valve closure member is defined further as extending through the injection aperture and into the flow passage in the conduit.

4. The apparatus of claim 1 wherein the valve body is defined further to include a conduit engagement surface formed on a portion of the valve body, the conduit engagement surface being matable with portions of the outer peripheral surface of the conduit.

5. The apparatus of claim 4 wherein the conduit engagement surface of the valve body is defined further as being formed on a radius.

6. The apparatus of claim 1 wherein the valve body is defined further to include a threaded bore extending through a portion of the valve body intersecting the valve chamber and the plug means includes intersecting a portion of the valve body, and a plug threadedly connected to the threaded bore, then the exit port is formed through the plug when the plug is threaded into the exit port of the valve body.

7. The apparatus of claim 6 wherein the plug is defined further as having a seat formed on a portion thereof adapted for seatingly engaging the valve closure member in the valve closure position of the valve closure member.

8. The apparatus of claim 6 wherein the plug is defined further as extending into the injection aperture in the conduit.

9. The apparatus of claim 8 wherein the plug is defined further as threadedly engaging the conduit.

10. The apparatus of claim 1 wherein the punch portion of the valve closure member is defined further as being tapered, the taper extending toward the flow passageway in the conduit.

* * * * *